(12) United States Patent
Hazama

(10) Patent No.: US 8,405,764 B2
(45) Date of Patent: Mar. 26, 2013

(54) IMAGING APPARATUS

(75) Inventor: Hisakazu Hazama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 13/012,716

(22) Filed: Jan. 24, 2011

(65) Prior Publication Data

US 2011/0181772 A1   Jul. 28, 2011

(30) Foreign Application Priority Data

Jan. 26, 2010   (JP) ................................. 2010-014500

(51) Int. Cl.
*H04N 5/222* (2006.01)
(52) U.S. Cl. ............................. 348/371; 396/61; 396/177
(58) Field of Classification Search .................. 348/371, 348/373, 375; 396/61, 62, 176, 177, 178
See application file for complete search history.

(56) References Cited

U.S. PATENT DOCUMENTS

| 6,493,510 | B2 * | 12/2002 | Shimizu | 396/62 |
| 6,535,690 | B2 * | 3/2003 | Tanabe | 396/62 |
| 8,208,805 | B2 * | 6/2012 | Tomimoto et al. | 396/178 |
| 2007/0019948 | A1 * | 1/2007 | Terada | 396/349 |

FOREIGN PATENT DOCUMENTS

JP       07-199295 A    8/1995

* cited by examiner

*Primary Examiner* — Chieh M Fan
*Assistant Examiner* — Wesley J Chiu
(74) *Attorney, Agent, or Firm* — Canon USA Inc. IP Division

(57) ABSTRACT

On a drive ring, a first cam and a second cam are formed. The first cam engages with a slider when a light emitting unit is in a stored state. The second cam releases engagement between the slider and the first cam to engage with the slider when the light emitting unit in the stored state is brought into the in-use state by a manual operation. When the light emitting unit is moved from the stored state to the in-use state by the manual operation, a gap is formed between the light emitting unit that becomes the stored state and the slider so that the light emitting unit moves from the stored state to the first state with a state in which the slider is in engagement with the first cam without moving.

4 Claims, 10 Drawing Sheets

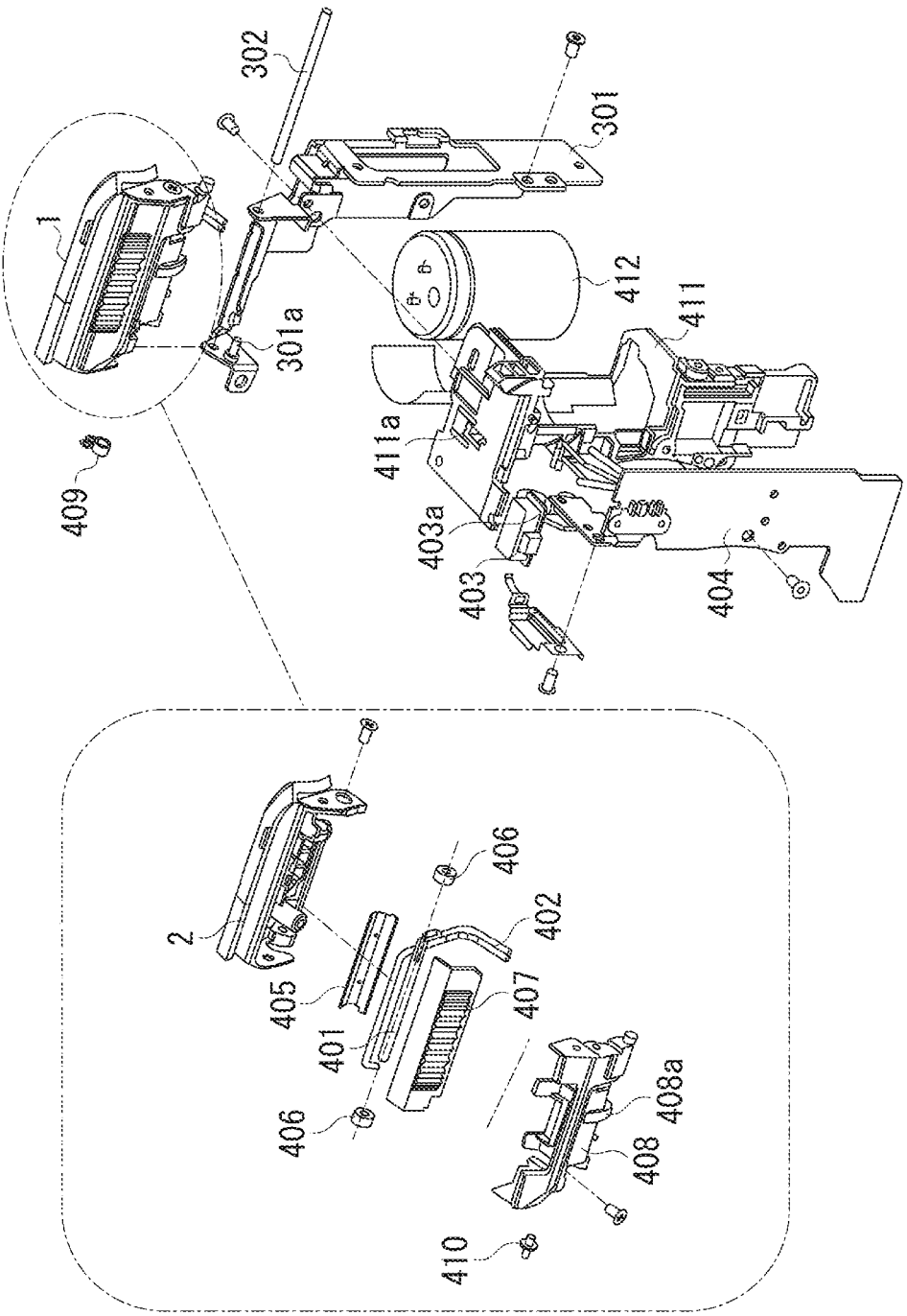

IMAGING APPARATUS

BACKGROUND OF THE INVENTION

1. Field of the Invention

The present invention relates to an imaging apparatus including a flash device that moves between an in-use state and a stored state.

2. Description of the Related Art

Conventionally, in an imaging apparatus including a flash device that moves between an in-use state and a stored state, if the imaging apparatus is in a state not ready for image shooting, such as when the power is off, a flash unit is in the stored state, and if the imaging apparatus is in a state ready for image shooting such as when the power is on, the flash unit is in the in-use state in which it protrudes from an imaging apparatus main body.

Japanese Patent Application Laid-Open No. 07-199295 discusses an imaging apparatus in which a flash unit is moved between an in-use state and a stored state in association with an extending operation of a lens barrel from a retracted position and a retracting operation thereof to the retracted position.

In the conventional imaging apparatus, when the imaging apparatus is in a state ready for image shooting, in which the lens barrel is extended, the flash unit is always in the protruding in-use state, and when the imaging apparatus is in the state not ready for image shooting, in which the lens barrel is retracted, the flash unit is always in the stored state.

SUMMARY OF THE INVENTION

According to an aspect of the present invention, an imaging apparatus includes a light emitting unit configured to be movable between an in-use state and a stored state, an urging member configured to urge the light emitting unit toward the stored state, a driving member configured to be driven by a drive source, and a moving member configured to abut on the light emitting unit by moving in association with the driving member to move the light emitting unit from the stored state to the in-use state against urging force of the urging member, wherein a first cam and a second cam which can engage with the moving member are formed in the driving member, and if a user moves the light emitting unit from the stored state to the in-use state by a manual operation during the moving member and the first cam are engaged with each other to bring the light emitting unit into the stored state, the moving member releases engagement with the first cam and engages with the second cam, and wherein, if the user moves the light emitting unit from the stored state to the in-use state by the manual operation, a first gap is formed between the light emitting unit which becomes the stored state and the moving member so that the light emitting unit moves from the stored state to a first state with a state in which the moving member is in engagement with the first cam without moving.

According to the present invention, there can be provided an imaging apparatus in which a manual operation can be performed without difficulty, even when a flash unit is brought into an in-use state from a stored state.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A and 4B are exploded perspective views of a flash unit.

DESCRIPTION OF THE EMBODIMENTS

Various exemplary embodiments, features, and aspects of the invention will be described in detail below with reference to the drawings.

Figure 1A:
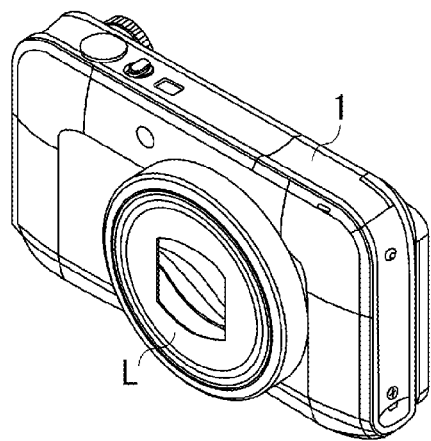
FIGS. 1A to 1D are outer appearance perspective views of a digital camera according to an exemplary embodiment of the present invention.
Figure 1B:
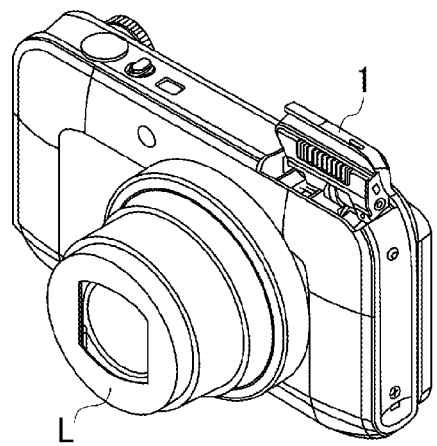

FIGS. 1A to 1D illustrate a digital camera as an imaging apparatus that implements the present invention, and illustrate four states of the digital camera according to an exemplary embodiment. FIG. 1A illustrates a power-off state that is an example when the imaging apparatus is in a state not ready for image shooting. In this state, a lens barrel unit L is in a retracted state and a flash unit 1 is in a stored state. FIG. 1B illustrates a power-on state that is an example when the imaging apparatus is in a state ready for image shooting. In this state, the lens barrel unit L is in an extended state and the flash unit 1 is in an in-use state.

Figure 1C:
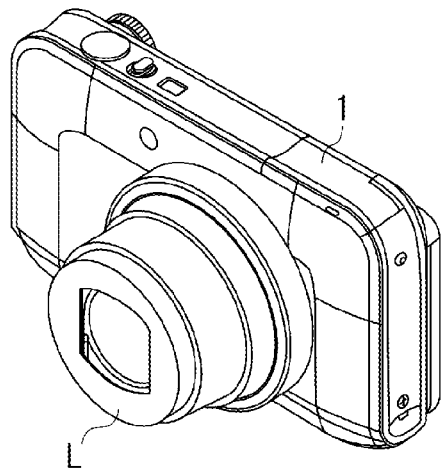
Figure 1D:
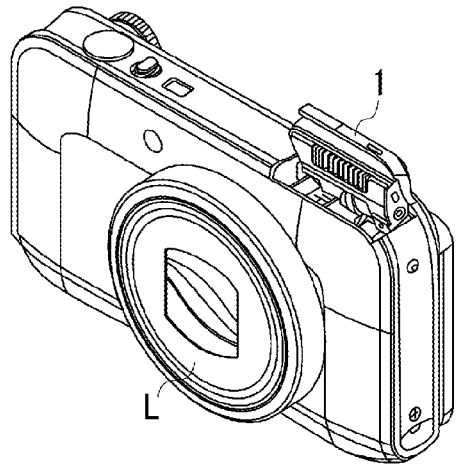

FIG. 1C illustrates a state in which the flash unit 1 is moved from the in-use state illustrated in FIG. 1B to the stored state by a manual operation. In this state, the lens barrel unit L is in the extended state and the flash unit 1 is brought into the stored state. FIG. 1D illustrates a state in which the flash unit 1 is moved from the stored state illustrated in FIG. 1A to the in-use state by a manual operation. In this state, the lens barrel unit L is in the retracted state and the flash unit 1 is brought into the in-use state.

The digital camera according to the present exemplary embodiment can be brought into the state illustrated in FIG. 1C from the state illustrated in FIG. 1B by the manual operation. Then, when power supply is turned off in the state in FIG. 1C, the digital camera is brought into the state in FIG. 1A while a flash device S remains in the stored state. Further, the digital camera according to the present exemplary embodiment can be brought into the state in FIG. 1D from the state in FIG. 1A. Then, when power supply is turned on in the state in FIG. 1D, the digital camera is brought into the state in FIG. 1B while the flash device S remains in the in-use state.

Figure 2:
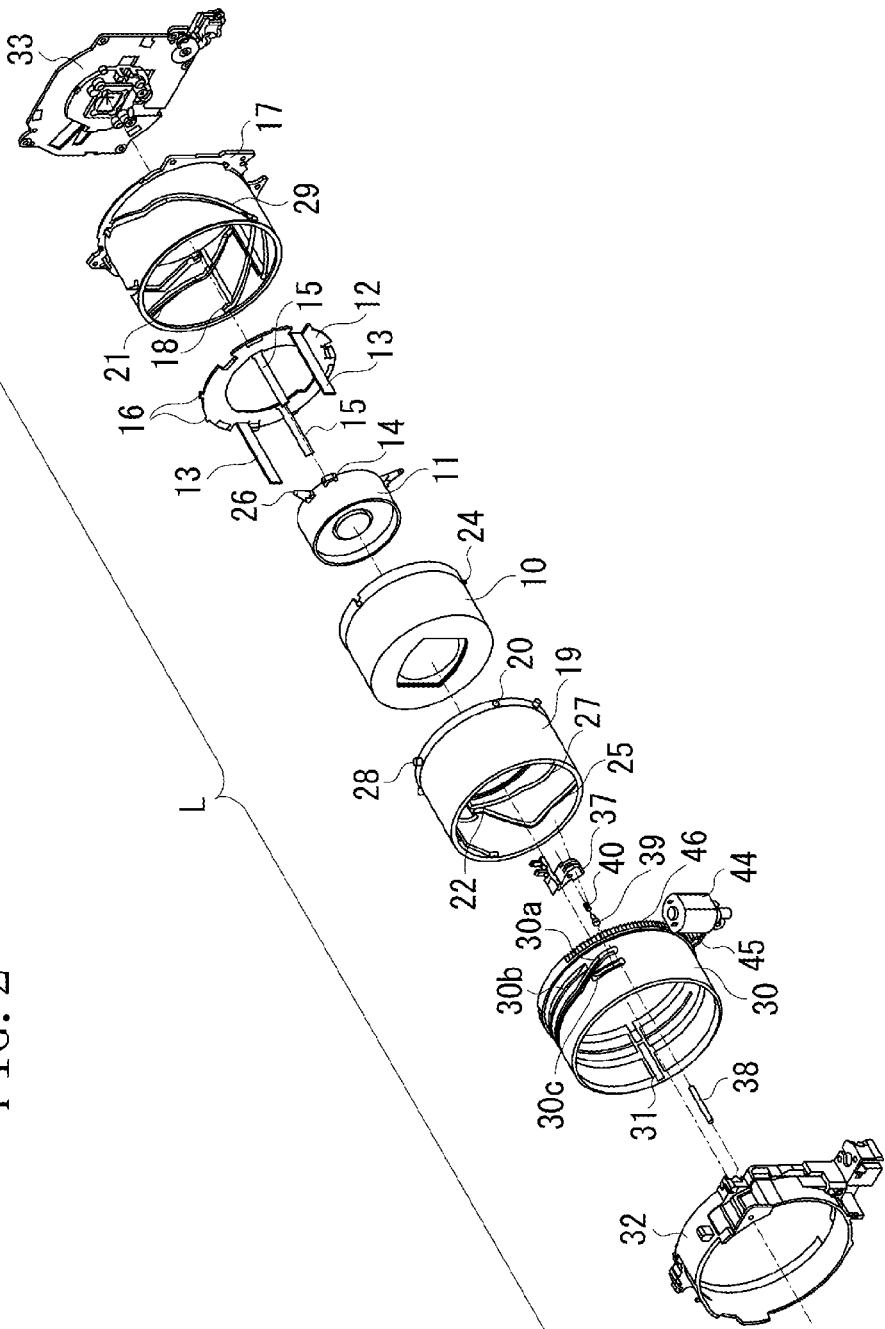
FIG. 2 is an exploded perspective view of a lens barrel unit.

FIG. 2 is an exploded perspective view of the lens barrel unit L of the digital camera. The lens barrel unit L includes a first group lens, a second lens group, and a third lens group (not illustrated). The first group lens is held by a first-group lens holder 10, and the second lens group is held by a second-group lens holder 11. On a rectilinear motion guide plate 12, first-group guide rods 13 that support the first-group lens holder 10 to be movable in an optical axis direction are formed.

The first-group guide rod 13 engages with a groove (not illustrated) which is formed on an inner surface of the first-group lens holder 10 and extends in the optical axis direction. Likewise, on the rectilinear motion guide plate 12, second-group guide rods 15 which support the second-group lens holder 11 to be movable in the optical axis direction is integrally formed. The second-group guide rod 15 engages with a second-group rectilinear motion hole 14 provided on an outer peripheral portion of the second-group lens holder 11, and supports the second-group lens holder 11 to be movable in the optical axis direction.

Therefore, the first-group lens holder 10 and the second-group lens holder 11 are guided to move in the optical axis direction by the first-group guide rods 13 and second-group guide rods 15 formed on the rectilinear motion guide plate 12, respectively. Further, a plurality of protrusions 16 are formed on an outer edge of a flange portion of the rectilinear motion guide plate 12. The protrusions 16 engage with a plurality of grooves 18 which are provided on an inner surface of a fixed cam ring 17 and extend in the optical axis direction respectively, so that the rectilinear motion guide plate 12 can be movably supported in the optical axis direction.

On an outer periphery surface of a moving cam ring 19, cam followers 20 are formed to divide the outer periphery into three equal portions. The cam followers 20 engage with three cams 21 which have the same shape and are formed on an inner surface of the fixed cam ring 17, respectively. Accordingly, the cam followers 20 can trace the cams 21 along with a rotation of the moving cam ring 19, and the moving cam ring 19 moves in the optical axis direction while rotating.

A hook 23 of the rectilinear motion guide plate 12 engages with an engagement groove 22 formed on a rear end of an inner periphery surface of the moving cam ring 19, so that the rectilinear motion guide plate 12 rotatably engages with the moving cam ring 19. Accordingly, along with a movement of the moving cam ring 19 in the optical axis direction, the rectilinear motion guide plate 12 also moves in the optical axis direction.

On an outer periphery surface of the first-group lens holder 10, first-group cam followers 24 are formed to divide the outer peripheral surface into three equal portions. The first-group cam followers 24 engage with three first-group cams 25 which have the same shape and are formed on the inner periphery surface of the moving cam ring 19, respectively. Accordingly, the first-group cam followers 24 can trace the first-group cams 25 along with the rotation of the moving cam ring 19. Further, since the first-group lens holder 10 is guided to move in the optical axis direction, the first-group lens holder 10 moves in accordance with a displacement amount of the first-group cams 25 in the optical axis direction along with the rotation of the moving cam ring 19.

On an outer periphery surface of the second-group lens holder 11, second-group cam followers 26 are formed to divide the outer peripheral surface into three equal portions. The second-group cam followers 26 engage with three second-group cams 27 which have the same shape and are formed on the inner periphery surface of the moving cam ring 19, respectively. Accordingly, the second-group cam followers 26 can trace the second-group cams 27 along with the rotation of the moving cam ring 19. Further, since the second-group lens holder 11 is guided to move in the optical axis direction, the second-group lens holder 11 moves in accordance with a displacement amount of the second-group cams 27 in the optical axis direction along with the rotation of the moving cam ring 19.

On the outer periphery surface of the moving cam ring 19, driving pins 28 are formed to divide the outer periphery surface into three equal portions. The driving pins 28 penetrate a cam hole 29 and protrude from an outer periphery surface of the fixed cam ring 17. The cam hole 29 penetrates the fixed cam ring 17 from an inner periphery surface to an outer periphery surface thereof. The cam 21 and the cam hole 29 have the same shape. The driving pins 28 traces the cam hole 29 and maintains a state of protruding from the fixed cam ring 17 with respect to rotating and extending movement of the moving cam ring 19 to the fixed cam ring 17.

A drive ring 30 serving as a driving member is fit into the outer periphery of the fixed cam ring 17 and rotatably supported thereby. On an inner periphery surface of the drive ring 30, grooves 31 extending in the optical axis direction are arranged to divide the inner periphery surface thereof into three equal portions. The driving pins 28 engage with the respective grooves 31. Accordingly, rotation of the drive ring 30 is transmitted to the moving cam ring 19 via the grooves 31 and the driving pins 28.

As described above, the first-group lens holder 10, the second-group lens holder 11, the rectilinear motion guide plate 12, the fixed cam ring 17, the moving cam ring 19, and the drive ring 30 are integrated, and operate in cooperation with each other. Then, the integrated components are incorporated into a lens barrel base 32. Further, an image sensor holder 33 for holding an image sensor is fixed to sandwich a flange portion of the fixed cam ring 17 between the lens barrel base 32 and the image sensor holder 33.

A driving source 44 of the lens barrel unit L is an electromagnetic motor for converting electric power into power. The power of the driving source 44 is transmitted to a drive ring gear 46 via a gear train 45 formed on the outer periphery surface of the drive ring 30. Accordingly, the drive ring 30 can be rotated when the electric current is applied to the driving source 44.

The lens barrel base 32 holds the driving source 44 and the gear train 45, and holds a slider 37 serving as a moving member to be movable in the optical axis direction. The slider 37 is guided by a slider shaft 38 held by the lens barrel base 32, so that the slider 37 can move in the optical axis direction on the lens barrel base 32. In the slider 37, a flash lamp follower 39 as a follower which can advance and retreat inside the slider 37 is formed, and the flash lamp follower 39 is urged in a direction protruding from the slider 37 by a compression spring 40.

On the outer periphery of the drive ring 30, a first flash lamp cam 30a, a second flash lamp cam 30b, and a third flash lamp cam 30c each of which can engage with the flash lamp follower 39 are formed. If the flash lamp follower 39 engages with the first flash lamp cam 30a, the slider 37 moves in the optical axis direction on the lens barrel base 32 by the rotation of the drive ring 30.

Figure 3A:
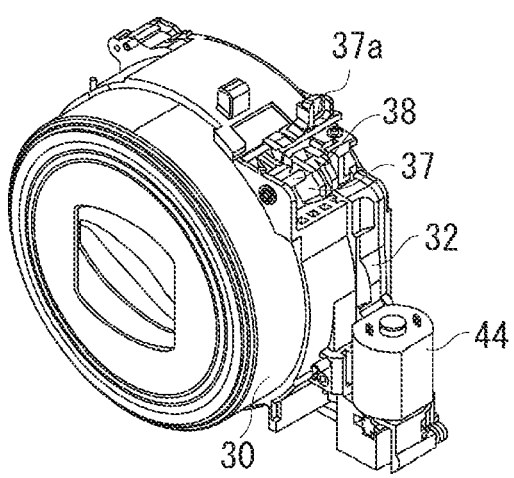
FIGS. 3A to 3C illustrate the lens barrel unit.
Figure 3B:
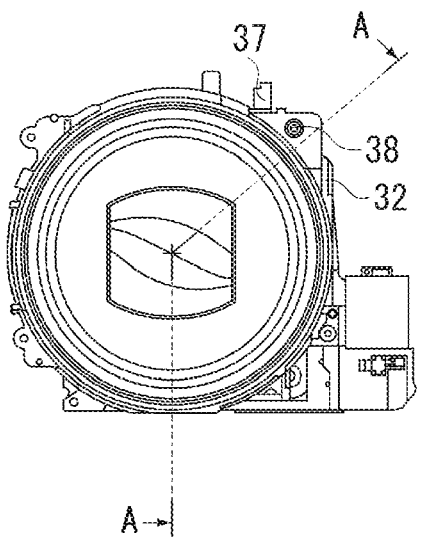
Figure 3C:
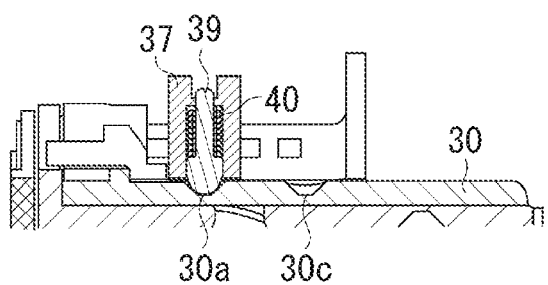

FIGS. 3A to 3C illustrate the lens barrel unit L. FIG. 3A is an outer appearance perspective view of the lens barrel unit L. In the state in FIG. 3A, the lens barrel unit L is in the retracted state. FIG. 3B is an outer appearance front view of the lens barrel unit L in the state in FIG. 3A. FIG. 3C is a cross-sectional view taken along a line A-A in FIG. 3B of the lens barrel unit L.

As illustrated in FIG. 3A, a U-shaped portion 37a is formed on the slider 37 and sandwiches a protrusion 408b formed to protrude from a flash lamp holder 408 described below therebetween. As illustrated in FIG. 3C, a hole portion is formed on the slider 37. The hole portion becomes substantially perpendicular to the outer periphery of the drive ring 30 in a state in which the slider 37 is supported by the slider shaft 38. The flash lamp follower 39 and the compression spring 40 are inserted into the hole portion. In the state in FIG. 3C, the flash lamp follower 39 is engaged with the first flash lamp cam 30a.

FIGS. 4A and 4B are exploded perspective views of the flash unit 1 of the digital camera. FIG. 4A is an exploded perspective view of the flash unit 1. A xenon tube 401 is electrically connected with a flexible circuit board 403 illustrated in FIG. 4B, by a lead wire 402. The flexible circuit board 403 is electrically connected with a flash lamp substrate 404 which performs flash emission control. A light reflector 405 gathers light from the xenon tube 401. A xenon tube rubber 406 serves as insulation of a terminal portion of the xenon tube 401, and urges the xenon tube 401 toward the light reflector 405 side. A prism panel 407 irradiates a desired range with the light from the xenon tube 401 and the light reflector 405.

After the xenon tube 401, the light reflector 405, the xenon tube rubber 406, and the prism panel 407 are arranged on the flash lamp holder 408, a flash lamp cover 2 is firmly fixed with screws to the flash lamp holder 408, so that the flash unit 1 is assembled.

FIG. 4B illustrates a structure for holding the flash unit 1 to be movable between the in-use state and the stored state.

The flash unit 1 is rotatably supported with respect to the flash lamp base 301 by a flash lamp shaft 302. A shaft 410 for hooking up on one end of a toggle spring 409 is pressure-inserted into the flash lamp holder 408. The other end of the toggle spring 409 is hooked up on a shaft 301a provided on the flash lamp base 301. The toggle spring 409 functions as an urging member for urging the flash unit 1 into the in-use state and the stored state around the flash lamp shaft 302 as the center of rotation.

The flexible circuit board 403, the flash lamp substrate 404, and a flash lamp capacitor 412 are attached on an attachment member 411. The flash lamp base 301 is also attached on the attachment member 411 with screws.

On the flexible circuit board 403, a lever type detection switch 403a is provided and detects whether the flash unit 1 is in the in-use state or at the retracted position. The lever type detection switch 403a is arranged so that a lever portion protrudes from a hole 411a on the attachment member 411. Therefore, when the flash unit 1 is in the stored state, a protrusion 408a of the flash lamp holder 408 pushes a lever portion of the detection switch 403a. On the other hand, when the flash unit 1 is in the in-use state, the protrusion 408a does not come into contact with the lever portion of the detection switch 403a. Only when the detection switch 403a detects that the flash unit 1 is in the in-use state, the digital camera performs control to cause the flash unit 1 to emit a flash.

Figure 5:
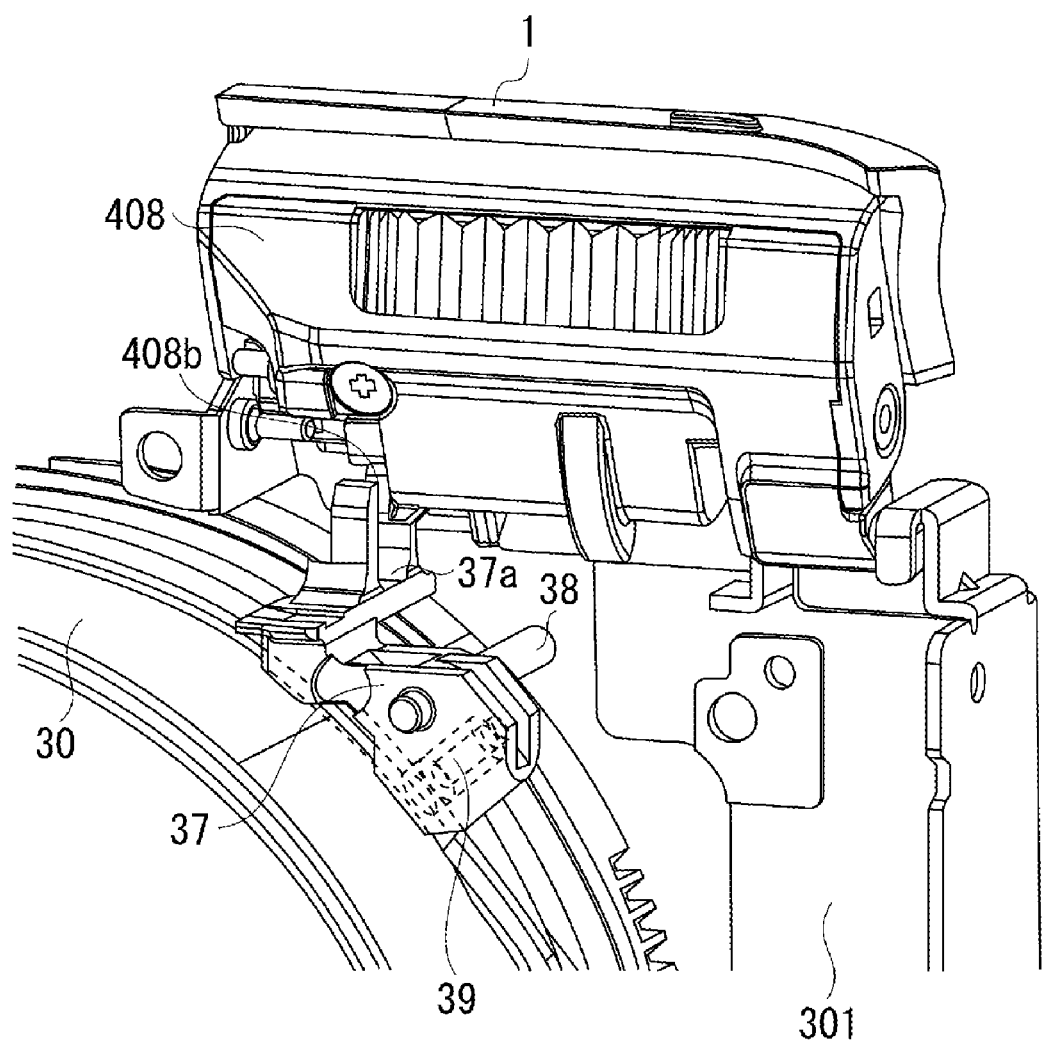
FIG. 5 illustrates a flash device.

FIG. 5 illustrates the flash device of the digital camera. In the present exemplary embodiment, a combination of the flash unit 1 and the slider 37 is referred to as the flash device.

In FIG. 5, the lens barrel base 32, the attachment member 411 and others are not illustrated. As described above, when the drive ring 30 rotates, the flash lamp follower 39 traces the first flash lamp cam 30a, and the slider 37 moves to the optical axis direction. Then, the flash unit 1 is rotatably supported with respect to the flash lamp base 301. As illustrated in FIG. 5, the protrusion 408b formed to protrude from the flash lamp holder 408 enters the U-shaped portion 37a formed on the slider 37. The slider 37 moves to the optical axis direction, and a wall 37a1 or a wall 37a2 of the U-shaped portion 37a pushes the protrusion 408b, so that the flash unit 1 moves between the stored state and the in-use state.

Figure 6A:
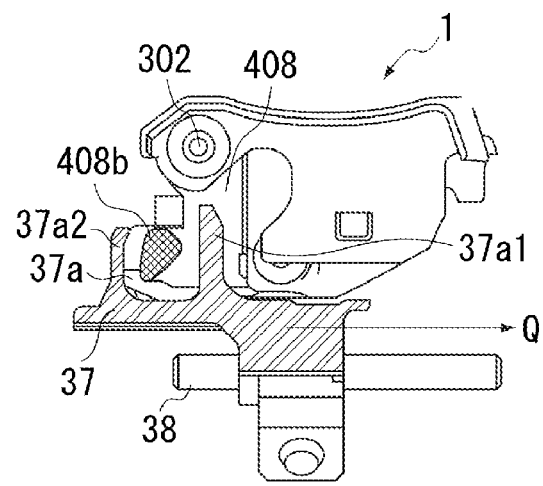
FIGS. 6A to 6C illustrate an operation when the flash device moves between an in-use state and a stored state.
Figure 6B:
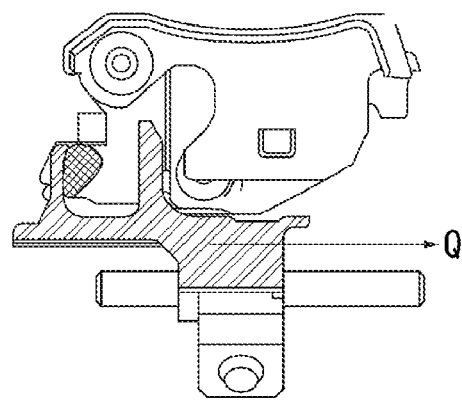
Figure 6C:
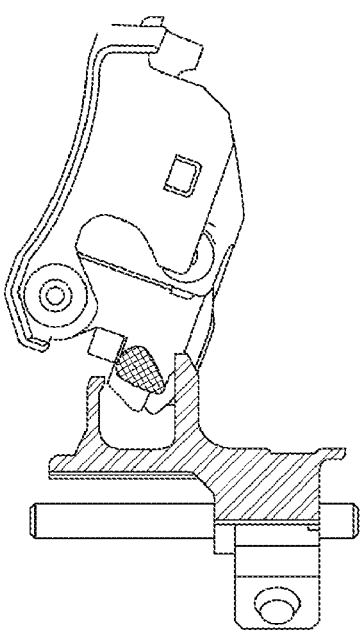

FIGS. 6A to 6C illustrate an operation to move the flash unit between the in-use state and the stored state. FIG. 6A illustrates the stored state in which the flash unit 1 is stored. As illustrated in FIG. 6A, in the stored state, although the protrusion 408b does not abut on any wall of the U-shaped portion 37a, the flash unit 1 is urged in a direction of the stored state by the toggle spring 409. Accordingly, the flash unit 1 can maintain the stored state.

FIG. 6B illustrates a state in which the slider 37 has moved in a direction of an arrow Q from the state in FIG. 6A. In this state, the wall 37a2 of the U-shaped portion 37 abuts on the protrusion 408b and moves the flash unit 1 to the in-use state against urging force of the toggle spring 409.

When the slider 37 moves the flash unit 1 to a point where a direction of the urging force of the toggle spring 409 is reversed from the state in FIG. 6B, the urging direction of the toggle spring 409 is reversed, and the flash unit 1 is urged in a direction of the in-use state. FIG. 6C illustrates a state in which the flash unit 1 is in the in-use state. At this time, although the protrusion 408b does not abut on any wall of the U-shaped portion 37a, the flash unit 1 is urged in a direction of the in-use state by the toggle spring 409, and accordingly the flash unit 1 can maintain the in-use state.

As described above, by moving the slider 37 in the optical axis direction, the flash unit 1 is moved from the stored state to the in-use state. When the flash unit 1 is moved from the in-use state to the stored state, it is only necessary to move the slider 37 in a leftward direction in the drawing from the state in FIG. 6C.

Figure 7A:
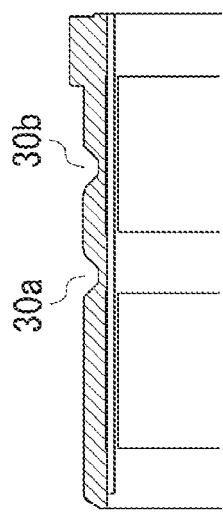
FIGS. 7A to 7C illustrate shapes of three cams which are formed on a drive ring 30.
Figure 7B:
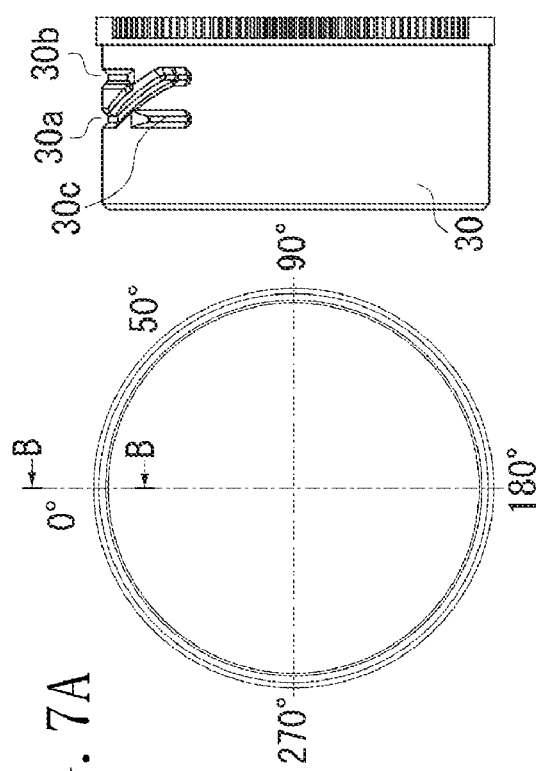
Figure 7C:
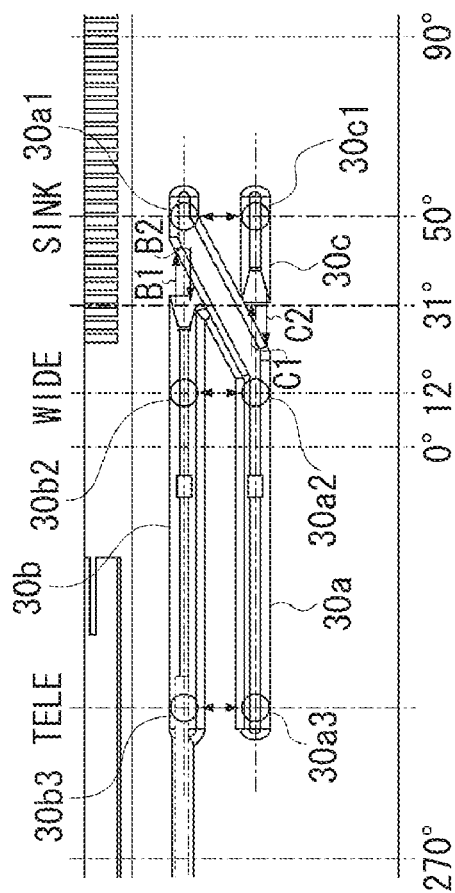

FIGS. 7A to 7C illustrate shapes of three cams formed on the drive ring 30. FIG. 7A is a front view and a side view of the drive ring 30. FIG. 7B is a cross-sectional view taken along a line B-B in FIG. 7A. FIG. 7C is an enlarged view of a portion where the first flash lamp cam 30a, the second flash lamp cam 30b, and the third flash lamp cam 30c are formed when the drive ring 30 is expanded.

Figure 8A:
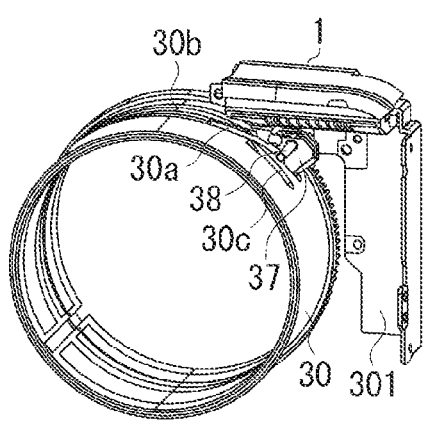
FIGS. 8A to 8D illustrate an operation of the flash device.
Figure 8B:
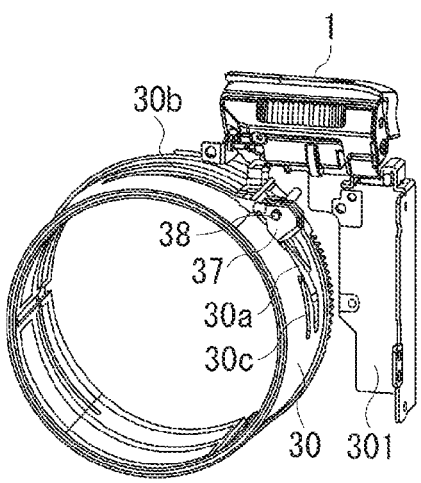
Figure 8C:
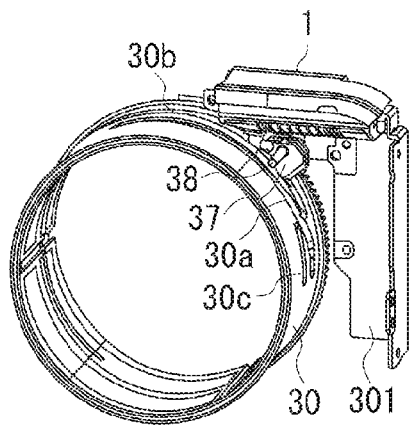
Figure 8D:
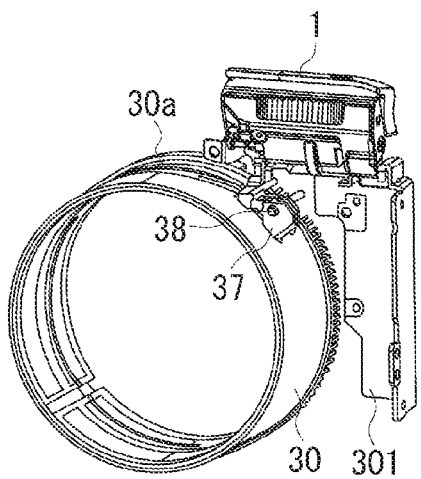

FIGS. 8A to 8D illustrate an operation of the flash device. FIG. 8A illustrates a state of the flash device when the digital camera according to the present exemplary embodiment is in the state in FIG. 1A. FIG. 8B illustrates a state of the flash device when the digital camera according to the present exemplary embodiment is in the state in FIG. 1B. FIG. 8C illustrates a state of the flash device when the digital camera according to the present exemplary embodiment is in the state in FIG. 1C. FIG. 8D illustrates a state of the flash device when the digital camera according to the present exemplary embodiment is in the state in FIG. 1D.

As illustrated in FIGS. 7A to 7C, the first flash lamp cam 30a as a first cam, the second flash lamp cam 30b as a second cam, and the third flash lamp cam 30c as a third cam are formed on the drive ring 30. The first flash lamp cam 30a is a cam for bringing the flash unit 1 into the in-use state from the stored state, when the lens barrel unit L becomes the extended state from the retracted state.

Further, the first flash lamp cam 30a is a cam for bringing the flash unit 1 into the stored state from the in-use state, when the lens barrel unit L becomes the retracted state from the extended state. Therefore, when the flash device changes between the state illustrated in FIG. 8A and the state illustrated in FIG. 8B, the flash lamp follower 39 of the slider 37 traces the first flash lamp cam 30a.

The second flash lamp cam 30b is a cam for bringing the lens barrel unit L into the retracted state from the extended state with the flash unit 1 remaining in the stored state, when the lens barrel unit L is in the extended state and the flash unit 1 becomes the stored state. Further, the second flash lamp cam 30b is a cam for bringing the lens barrel unit L into the extended state from the retracted state by pressing down the flash unit 1 to remain in the stored state, when the lens barrel unit L becomes the extended state from the retracted state. Therefore, when the flash unit is changed between the state illustrated in FIG. 8C and the state illustrated in FIG. 8A, the flash lamp follower 39 of the slider 37 traces the second flash lamp cam 30*b*.

The third flash lamp cam 30*c* is a cam for bringing the lens barrel unit L into the extended state from the retracted state with the flash unit 1 remaining in the in-use state, when the lens barrel unit L is in the retracted state and the flash unit 1 becomes the in-use state. Further, the third flash lamp cam 30*c* is a cam for bringing the lens barrel unit L into the retracted state from the extended state by pressing down the flash unit 1 to remain in the in-use state, when the lens barrel unit L becomes the retracted state from the extended state. Therefore, when the flash unit is changed between the state illustrated in FIG. 8B and the state illustrated in FIG. 8D, the flash lamp follower 39 of the slider 37 traces the third flash lamp cam 30*c*.

In FIG. 7C, when the lens barrel unit L illustrated in FIG. 8A becomes the retracted state and the flash unit 1 becomes the stored state, the flash lamp follower 39 of the slider 37 is located at a position 30*a*1. When the lens barrel unit L illustrated in FIG. 8B becomes a wide-angle state as the extended state and the flash unit 1 becomes the in-use state, the flash lamp follower 39 of the slider 37 is located at a position 30*a*2.

When the lens barrel unit L becomes a telephoto state as the extended state and the flash unit 1 becomes the in-use state, the flash lamp follower 39 of the slider 37 is located at a position 30*a*3. The first flash lamp cam 30*a* causes the flash unit 1 to move between the stored state and the in-use state between the position 30*a*1 and the position 30*a*2, and a cam lift is set to substantially zero between the position 30*a*2 and the position 30*a*3.

As illustrated in FIG. 8B, if the flash unit 1 is brought into the stored state by a manual operation when the flash lamp follower 39 of the slider 37 is located at the position 30*a*2, the flash unit 1 goes into the state illustrated in FIG. 8C. At this time, the flash lamp follower 39 releases engagement with the first flash lamp cam 30*a*, and engages with the second flash lamp cam 30*b* at a position 30*b*2. Likewise, if the flash unit 1 is brought into the stored state by the manual operation when the flash lamp follower 39 is located at the position 30*a*3, the flash lamp follower 39 releases the engagement with the first flash lamp cam 30*a*. Then, the flash lamp follower 39 engages with the second flash lamp cam 30*b* at a position 30*b*3.

Figure 9A:
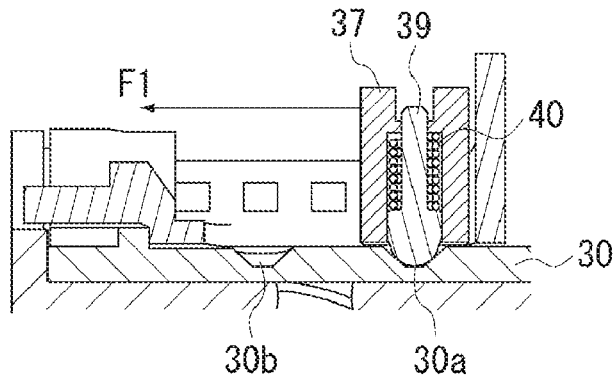
FIGS. 9A to 9D illustrate how the flash device is manually operated.
Figure 9B:
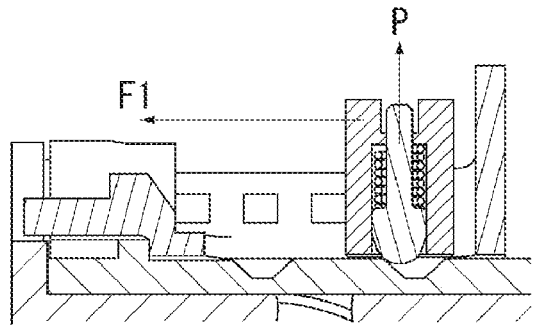
Figure 9C:
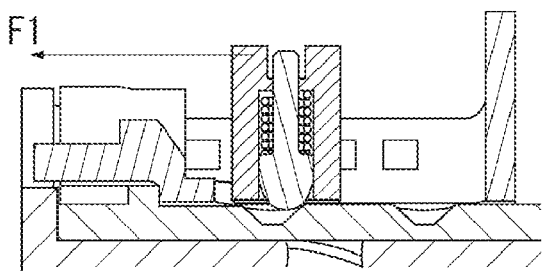

FIGS. 9A to 9D illustrate an operation when the flash device is manually operated. FIG. 9A illustrates a state where the flash lamp follower 39 of the slider 37 is located at the position 30*a*2. In this state, if the flash unit 1 is retracted by the manual operation, force in an arrow F1 direction acts on the slider 37 as illustrated in FIG. 9B, and the flash lamp follower 39 moves in an arrow P direction against the urging force of the compression spring 40. In other words, the flash lamp follower 39 retreats inside the slider 37

Accordingly, the flash lamp follower 39 releases the engagement with the first flash lamp cam 30*a*, and the slider 37 moves in the arrow F1 direction. Then, when the slider 37 becomes a state illustrated in FIG. 9C, the flash lamp follower 39 is inserted into the second flash lamp cam 30*b* by the urging force of the compression spring 40. At this time, when the flash lamp follower 39 is inserted into the second flash lamp cam 30*b*, a leading edge of the flash lamp follower 39 slides on a slanting surface of the second flash lamp cam 30*b*, and consequently force in the arrow F1 direction acts on the slider 37.

Figure 9D:
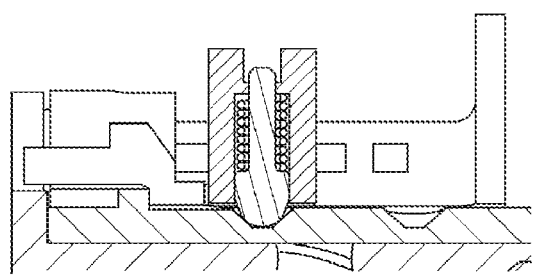

Then, as illustrated in FIG. 9D, the flash lamp follower 39 engages with the second flash lamp cam 30*b*. In this way, since the flash lamp follower 39 advances to and retreats from a hole portion of the slider 37 which is substantially perpendicular to an outer periphery surface of the drive ring 30, the flash lamp follower 39 can perform engagement with the cam and release of the engagement without stress.

If the lens barrel unit L becomes the retracted state from the extended state, when the flash lamp follower 39 engages with the second flash lamp cam 30*b*, the flash lamp follower 39 traces the second flash lamp cam 30*b* to a rightward end thereof illustrated in FIG. 7C. Then, the flash lamp follower 39 releases engagement with the second flash lamp cam 30*b*, advances to an arrow B1 direction in FIG. 7C, and engages with the first flash lamp cam 30*a* to be located at the position 30*a*1.

When the flash lamp follower 39 is located at the position 30*a*1, the lens barrel unit L is brought into the wide-angle state from the retracted state while pressing the flash unit 1 to remain in the stored state. At this time, the flash lamp follower 39 releases the engagement with the first flash lamp cam 30*a*, and advances to an arrow B2 direction in FIG. 7C. Then, the flash lamp follower 39 engages with the second flash lamp cam 30*b* to be located at the position 30*b*2.

If the flash unit 1 is brought into the in-use state by the manual operation when the flash lamp follower 39 is located at the position 30*a*1, as illustrated in FIG. 8A, the flash unit 1 becomes the state illustrated in FIG. 8D. At this time, the flash lamp follower 39 releases the engagement with the first flash lamp cam 30*a*, and engages with the third flash lamp cam 30*c* at the position 30*c*1. If the lens barrel unit L is brought into the wide-angle state from the retracted state when the flash lamp follower 39 is located at the position 30*c*1, the flash lamp follower 39 releases the engagement with the third flash lamp cam 30*c*, and advances to an arrow C1 direction. Then, the flash lamp follower 39 engages with the first flash lamp cam 30*a* to be located at the position 30*a*2.

When the flash lamp follower 39 is located at the position 30*a*2, the lens barrel unit L is brought into the retracted state from the wide-angle state while pressing the flash unit 1 to remain in the in-use state. At this time, the flash lamp follower 39 releases the engagement with the first flash lamp cam 30*a*, and advances to the arrow C2 direction in FIG. 7C. Then, the flash lamp follower 39 engages with the third flash lamp cam 30*c* to be located at the position 30*c*1.

In the present exemplary embodiment, the first flash lamp cam 30*a* and the second flash lamp cam 30*b*, and the first flash lamp cam 30*a* and the third flash lamp cam 30*c* are not connected with each other. For example, if the first flash lamp cam 30*a* and the second flash lamp cam 30*b* are connected with each other, when the flash lamp follower 39 is brought into a state where being located at the position 30*a*2 from a state where being located at the position 30*a*1, the flash lamp follower 39 will be brought into a state where being located at the position 30*b*2.

In other words, without tracing the first flash lamp cam 30*a*, the flash lamp follower 39 will trace the second flash lamp cam 30*b*. Therefore, in the present exemplary embodiment, the first flash lamp cam 30*a* and the second flash lamp cam 30*b*, and the first flash lamp cam 30*a* and the third flash lamp cam 30*c* are separated from each other.

FIGS. 10A to 10D illustrate an operation for moving the flash device in the stored state to the in-use state by the manual operation.

Figure 10A:
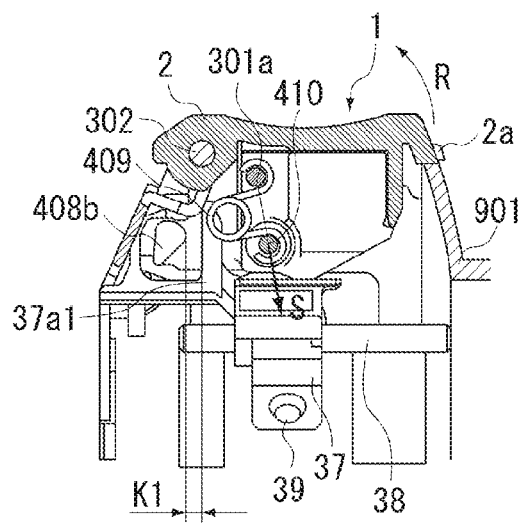
FIGS. 10A to 10D illustrate an operation for moving the flash device from a stored state to an in-use state by a manual operation.

FIG. 10A illustrates a relationship between the slider 37 and the protrusion 408*b* of the flash lamp holder 408, when the flash unit is in the stored state, as illustrated in FIG. 8A or FIG. 8C. When a state illustrated in FIG. 10A corresponds to the state illustrated in FIG. 8A, the flash lamp cam follower 39 engages with the first flash lamp cam 30*a*. When the state illustrated in FIG. 10A corresponds to the state illustrated in FIG. 8C, the flash lamp cam follower 39 engages with the second flash lamp cam 30b. In the state illustrated in FIG. 10A, a first gap K1 is formed between the protrusion 408b and the wall 37a1 of the U-shaped portion 37a. In this state, a direction S in which the toggle spring 409 urges the flash unit 1 coincides with a direction in which the toggle spring 409 urges the flash unit 1 toward the stored state.

When the flash unit 1 is moved to the in-use state by the manual operation from the state illustrated in FIG. 10A, the manual operation is performed in an arrow R direction with putting finger on a protrusion 2a formed on the flash lamp cover 2. When the flash unit 1 is rotated in the arrow R direction by the manual operation, the first gap K1 disappears, and the protrusion 408b abuts on the wall 37a1 of the U-shaped portion 37a.

Figure 10B:
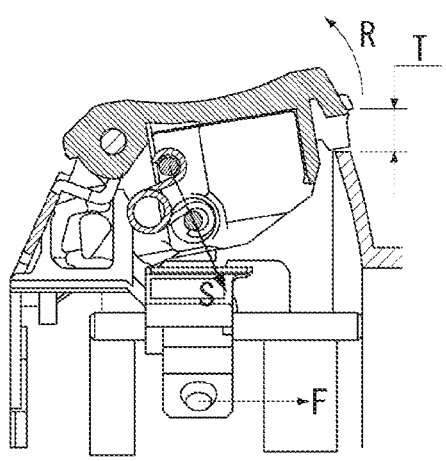

FIG. 10B illustrates this state. In the present exemplary embodiment, the state illustrated in FIG. 10B is referred to as a first state of the flash unit 1. At this time, a gap T is formed between the flash lamp cover 2 and a main body cover 901. From the state in FIG. 10A to the state in FIG. 10B, only the flash unit 1 is moved by the manual operation, and the slider 37 is not moved.

Force necessary for the manual operation to shift the state illustrated in FIG. 10A to the state illustrated in FIG. 10B may be greater than the urging force of the toggle spring 409 to urge the flash unit 1 toward the stored state. In other words, the flash unit 1 can be moved from the stored state illustrated in FIG. 10A to the state in FIG. 10B with relatively small operation force.

Figure 10C:
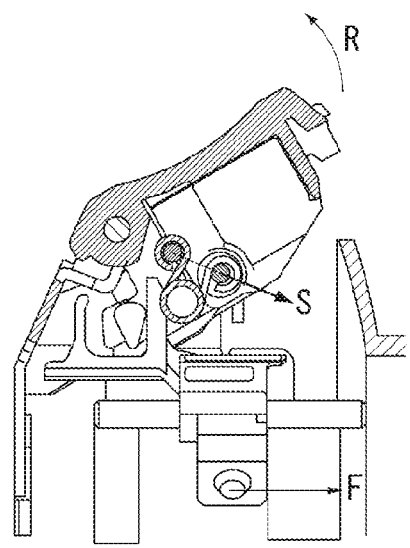

When the flash unit 1 is further rotated in the arrow R direction from the state illustrated in FIG. 10B, the protrusion 408b presses the wall 37a1 of the U-shaped portion 37a, and the slider 37 is also moved in an arrow F direction. FIG. 10C illustrates a state where the flash lamp shaft 302 of the flash unit 1, the shaft 301a and the shaft 410 on which the toggle spring 409 is hooked are aligned on a straight line. Beyond this position, the direction S in which the toggle spring 409 urges the flash unit 1 coincides with a direction in which the toggle spring 409 urges the flash unit 1 to the in-use state.

Force necessary for the manual operation to shift the state illustrated in FIG. 10B to the state illustrated in FIG. 10C needs to be greater than resultant force of the urging force which the toggle spring 409 urges the flash unit 1 toward the stored state and force for moving the slider 37.

In order to move the slider 37, engagement between the flash lamp cam follower 39 and the first flash lamp cam 30a or engagement between the flash lamp cam follower 39 and the second flash lamp cam 30b needs to be released. Force for causing the flash lamp follower 39 to retreat inside the slider 37 against the urging force of the compression spring 40 is required to release the engagement between the flash lamp cam follower 39 and the first flash lamp cam 30a or the engagement between the flash lamp cam follower 39 and the second flash lamp cam 30b.

More specifically, the force for the manual operation required to shift the state in FIG. 10B to the state in FIG. 10C becomes greater than the force for the manual operation required to shift the state in FIG. 10A to the state in FIG. 10B. In the state in FIG. 10B, since a user can puts his/her finger into the gap T formed between the flash lamp cover 2 and the main body cover 901, it is easy for the user to apply force on the flash unit 1.

When the state in FIG. 10A in which the gap T is not formed is shifted to the state in FIG. 10B, since the user needs to push up the protrusion 2a of the flash lamp cover 2, necessary force for the manual operation is made relatively small. If a size of the protrusion 2a is made bigger, the flash unit 1 can be also pushed up with greater force from the stored state. However, to increase the size of the protrusion 2a is not preferable from the viewpoint of design of the digital camera.

Taking these points into consideration, in the digital camera according to the present exemplary embodiment, the first gap K1 is formed so that even a small protrusion can produce sufficient operation force to manually operate the flash unit 1 from the stored state to the first state.

Figure 10D:
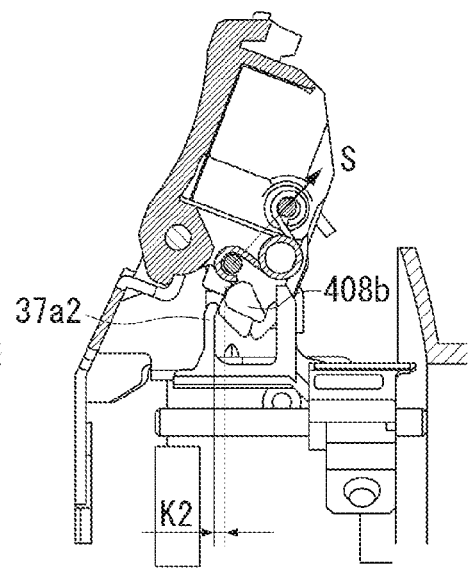

FIG. 10D illustrates a relationship between the slider 37 and the protrusion 408b of the flash lamp holder 408, when the flash unit becomes the in-use state as illustrated in FIG. 8B or FIG. 8D. When the state illustrated in FIG. 10D corresponds to the state illustrated in FIG. 8B, the flash lamp cam follower 39 engages with the first flash lamp cam 30a. When the state illustrated in FIG. 10D corresponds to the state illustrated in FIG. 8D, the flash lamp cam follower 39 engages with the third flash lamp cam 30c.

In the state illustrated in FIG. 10D, the direction S in which the toggle spring 409 urges the flash unit 1 coincides with the direction in which the toggle spring 409 urges the flash unit 1 toward the in-use state. In this state, a second gap K2 is formed between the protrusion 408b and the wall 37a2 of the U-shaped portion 37a.

Further, when the state is in that illustrated in FIG. 10D, the flash unit 1 is urged toward the in-use state by the toggle spring 409, and the flash lamp cam follower 39 engages with the first flash lamp cam 30a or the third flash lamp cam 30c. When the flash lamp cam follower 39 begins to engage with the first flash lamp cam 30a or the third flash lamp cam 30c, the slider 37 is drawn in the rightward direction in FIG. 10D.

This is because the flash lamp cam follower 39 urged by the compression spring 4 is inserted into the first flash lamp cam 30a or the third flash lamp cam 30c, so that the slider 37 is moved. Accordingly, even in the state illustrated in FIG. 10D, a gap is formed between the protrusion 408b and the wall 37a1 of the U-shaped portion 37a.

In the state illustrated in FIG. 10D, if the flash unit 1 is moved to the state illustrated in FIG. 10A by the manual operation, the flash unit 1 can be pushed down with only force against the urging force of the toggle spring 409 until the second gap K2 disappears. Then, the protrusion 408b abuts on the wall 37a2 of the U-shaped portion 37a to move the slider 37, and becomes the state illustrated in FIG. 10A. A state in which the second gap K2 disappears, and the protrusion 408b abut on the wall 37a2 of the U-shaped portion 37a is referred to as a second state.

In the state in FIG. 10A, the flash lamp cam follower 39 urged by the compression spring 40 is also inserted into the first flash lamp cam 30a or the second flash lamp cam 30b, so that the slider 37 can be moved. Therefore, a gap is formed between the protrusion 408b and the wall 37a2 of the U-shaped portion 37a.

As described above, with the digital camera according to the present exemplary embodiment, when the digital camera is brought into a power-on state that is an example of the state ready for image shooting from a power-off state that is an example of the state not ready for image shooting, the flash device is brought into the in-use state from the stored state. When the flash device is in the in-use state in the power-on state, the flash device can be brought into the stored state from the in-use state by the manual operation, and the digital camera can be brought into the power-off state with the flash device remaining in the stored state. When the flash device is in the stored state in the power-off state, the flash device can be brought into the in-use state from the stored state by the manual operation, and the digital camera can be brought into the power-on state with the flash unit remaining in the in-use state.

Therefore, in addition that the flash device can be moved between the in-use state and the stored state in association with the lens barrel unit, the flash device can be moved between the in-use state and the stored state by the manual operation, even in the power-on state or the power-off state. Further, after the flash device is moved by manual operation, power supply of the digital camera can be turned on or off while remaining the state of the flash device as it is. More specifically, even if the flash device is stored by the manual operation during the power-on state and then power supply is turned off, when the power supply is turned on next, the flash device can be brought into the in-use state from the stored state. Similarly, if the flash device is brought into the in-use state by the manual operation during the power-off state and then the power supply is turned on, when the power supply is turned off, the flash device can be brought into the stored state from the in-use state.

By forming the first gap K1, the flash unit 1 can move from the stored state to the first state without causing the slider 37 to move, when the flash unit 1 is moved from the stored state to the in-use state by the manual operation. Then, when the flash unit 1 and the slider 37 begin to move in an integrated manner, a gap T is formed which makes easy to apply large force to the flash unit 1.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-014500 filed Jan. 26, 2010, which is hereby incorporated by reference herein in its entirety.

What is claimed is:

1. An imaging apparatus comprising:
   a light emitting unit configured to be movable between an in-use state and a stored state;
   an urging member configured to urge the light emitting unit toward the stored state;
   a driving member configured to be driven by a drive source; and
   a moving member configured to abut on the light emitting unit by moving in association with the driving member to move the light emitting unit from the stored state to the in-use state against urging force of the urging member,
   wherein a first cam and a second cam which can engage with the moving member are formed in the driving member, and if a user moves the light emitting unit from the stored state to the in-use state by a manual operation when the moving member and the first cam are engaged with each other to bring the light emitting unit into the in-use state, the moving member releases engagement with the first cam and engages with the second cam, and
   wherein, if the user moves the light emitting unit from the stored state to the in-use state by the manual operation, a first gap is formed between the light emitting unit which is in the stored state and the moving member so that the light emitting unit moves from the stored state to a first state with a state in which the moving member is in engagement with the first cam without moving,
   wherein a gap is formed between the light emitting unit and an imaging apparatus main body by moving the light emitting unit from the stored state to the first state.

2. The imaging apparatus according to claim 1,
   wherein, if the user moves the light emitting unit from the in-use state to the stored state when the moving member and the second cam are engaged with each other and the light emitting unit is in the in-use state, a second gap is formed between the light emitting unit which is in the in-use state and the moving member so that the light emitting unit moves from the in-use state to a second state with a state in which the moving member is in engagement with the second cam without moving.

3. The imaging apparatus according to claim 2,
   wherein the urging member is a toggle spring that urges the light emitting unit toward the stored state if the light emitting unit is brought into the stored state, and urges the light emitting unit toward the in-use state if the light emitting unit is brought into the in-use state,
   wherein the toggle spring urges the light emitting unit toward the stored state while the light emitting unit moves from the stored state to the first state, and the toggle spring urges the light emitting unit toward the in-use state while the light emitting unit moves from the in-use state to the second state.

4. The imaging apparatus according to claim 1,
   wherein, a follower that can engage with the first cam or the second cam, and retreats inside the moving member if engagement with the first cam or the second cam is released is formed in the moving member.

* * * * *